United States Patent [19]
Bouiller et al.

[11] Patent Number: 5,623,821
[45] Date of Patent: Apr. 29, 1997

[54] TURBOJET EQUIPPED WITH A DEICING SYSTEM ON THE INTAKE CASE

[75] Inventors: Philippe Bouiller, Samoreau; Claude G. Corbin, Voisenon; Michel Franchet, Cesson; Gérard E. A. Jourdain, Saintry Sur Seine, all of France

[73] Assignee: Societe Nationale d'Etude et de Construction de Moteurs d'Aviation "Snecma", Paris, France

[21] Appl. No.: 509,054

[22] Filed: Jul. 31, 1995

[30] Foreign Application Priority Data

Aug. 18, 1994 [FR] France .................................. 94 10102

[51] Int. Cl.$^6$ .................................................. F02C 7/047
[52] U.S. Cl. .................. 60/39.093; 415/175; 219/679; 244/134 D
[58] Field of Search .............. 60/39.093; 415/175, 415/176; 219/679, 695, 746; 244/134 R, 134 D, 53 B

[56] References Cited

U.S. PATENT DOCUMENTS

| 4,365,131 | 12/1982 | Hansman, Jr. . | |
| 4,863,354 | 9/1989 | Asselin et al. | 60/39.093 |
| 5,029,440 | 7/1991 | Graber et al. | 60/39.093 |
| 5,061,836 | 10/1991 | Martin . | |

FOREIGN PATENT DOCUMENTS

| 686024 | 2/1967 | Belgium . | |
| 1016933 | 11/1952 | France . | |
| 1103223 | 10/1955 | France . | |
| 2346217 | 10/1977 | France . | |
| 2136880 | 9/1984 | United Kingdom | 60/39.093 |
| 2259287 | 3/1993 | United Kingdom . | |

*Primary Examiner*—Charles G. Freay
*Attorney, Agent, or Firm*—Oblon, Spivak, McClelland, Maier & Neustadt, P.C.

[57] ABSTRACT

A turbojet having an air intake case including radial arms between an outer annular structure and an inner central structure, and a deicing unit configured to deice the radial arms by microwaves and located in the central structure. The deicing unit has a microwave generator and a transmitting element configured to transmit energy and including an inside annular waveguide located inside of the central structure. An energy distributing element configured to eliminate ice is coupled with the transmitting element by a coupling element. The radial arms are made from a dielectric composite material.

8 Claims, 6 Drawing Sheets

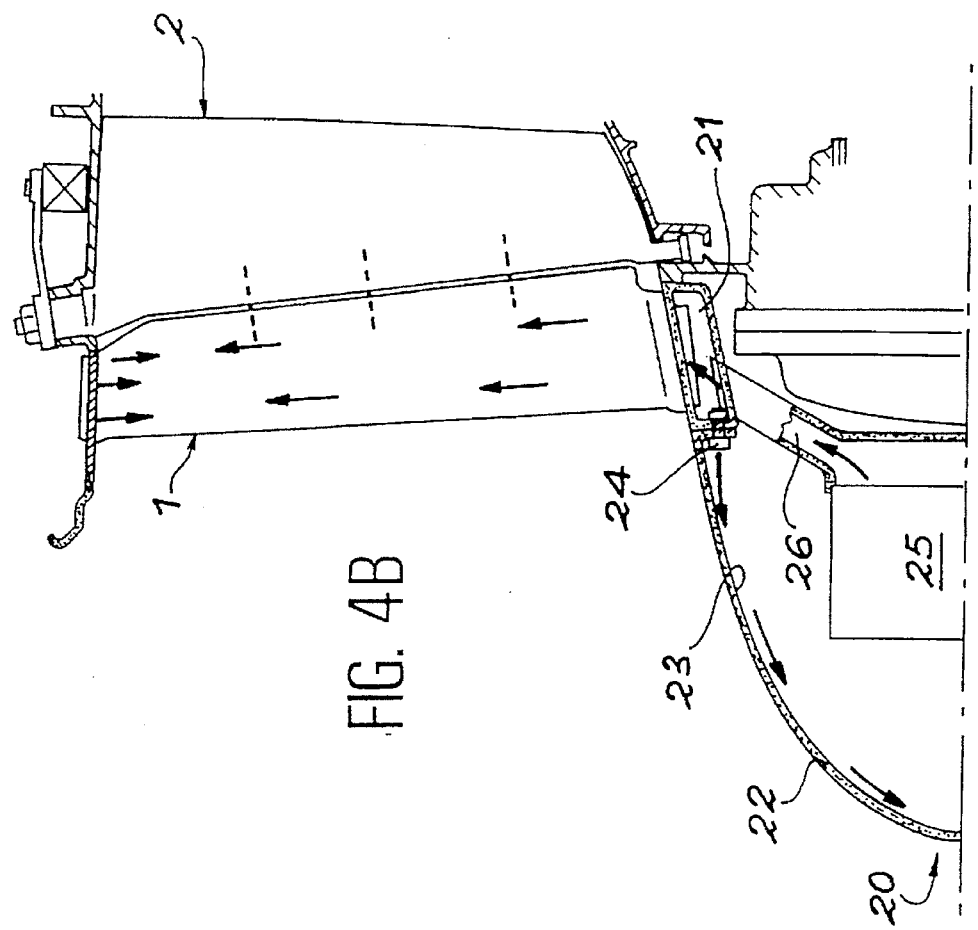
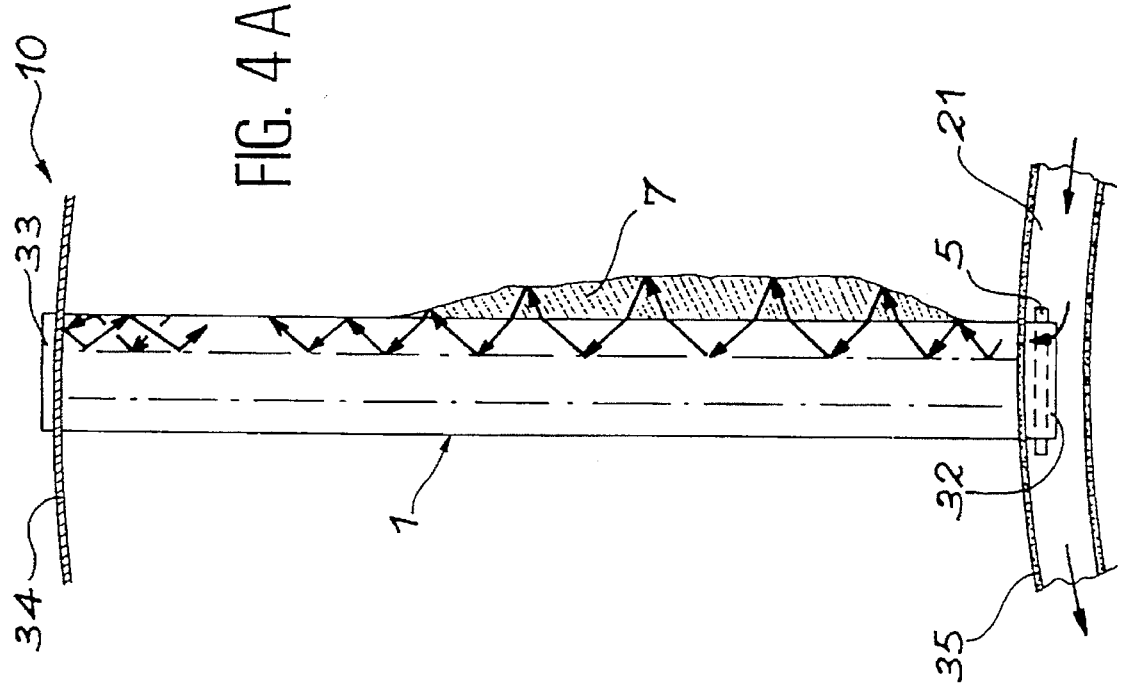

TURBOJET EQUIPPED WITH A DEICING SYSTEM ON THE INTAKE CASE

BACKGROUND OF THE INVENTION

1. Field of the Invention

The invention relates to deicing systems for air navigation and in particular on aircraft turbojets or turbojet engines. Thus, certain parts of the turbojet, such as the intake case, are exposed to problems caused by ice.

2. Discussion of the Background

Under certain climatic conditions encountered by aircraft during flight, the turbojet air intake is liable to be exposed to icing phenomena. In particular, the turbojet intake case, its radial arms, its cowls and its mobile flaps can be subject to an accumulation of ice, which obviously leads to a deterioration of the aerodynamic performance characteristics of the turbojet. Moreover, the ice blocks which are then detached from these different components can damage the rotor of the turbojet located in the downstream direction, when they are sucked into the latter. Thus, there is a need to prevent the formation of ice or eliminate it after detecting its formation.

The most widely used devices make use of a hot air circulation or electrical heating resistors. Thus, these devices have to dissipate very high powers and significantly raise the temperature of the structures in question. Even though this temperature can be withstood by the metal components, this is not the situation with regards to the composite structures for which it is necessary to use difficultly implementable materials.

French patent application FR-A-2 346 217 discloses a system for deicing by microwaves composite material helicopter blades. Reference is also made therein to the possibility of applying this procedure to aircraft.

The object of the present invention is to apply such a heating method to the upstream parts of an aircraft turbojet in order to prevent icing on the case, radial arms, cowl and flaps.

SUMMARY OF THE INVENTION

Therefore the invention mainly relates to a turbojet having an air intake case equipped with dielectric composite material radial arms extending between an outer, annular structure and an inner, central structure. This turbojet is equipped with means for deicing the radial arms by microwaves located on the central structure having a microwave generator fixed to the intake case, means for transmitting the energy supplied by the generator, means for distributing the energy in the arms to be heated constituted by an annular waveguide placed within said central structure and against its outer wall and means for coupling the arms with the energy transmission means.

In two first embodiments, the deicing means are located on the outer structure, in the form of at least one annular waveguide placed on the outer structure, the microwave generator also being placed on said outer structure.

In the first of these embodiments, the waveguide has first transverse openings on its inner wall and in each of said openings is placed the outer end of one of the radial arms, said outer end being fixed in the outer structure.

Preferably, in this case, the radial arms are fixed to the outer structure by means of pins traversing the outer end of the radial arms in the waveguide and constituting coupling means.

In the second embodiment the waveguide is still annular and has second transverse openings on its inner surface issuing between and alongside radial arms in order to permit the microwaves to pass out of the waveguide and be oriented towards the outer surfaces of the radial arms.

Preferably, the waveguide has third transverse openings on its outer surface in each of which is placed the inner end of one of the arms, said inner end being fixed to the central structure. In this case, the coupling means are constituted by fixing bolts for fixing the waveguide to the central structure.

When each radial arm is equipped with a mobile flap, the coupling means also comprise coaxial conductor cables connecting the trailing edge of each radial arm to the leading edge of the corresponding mobile flap.

In order to improve microwave efficiency, the cowl of the inner, central structure is internally metallized.

BRIEF DESCRIPTION OF DRAWINGS

The invention and its various technical features will be better understood from studying the following description relative to the attached drawings, wherein show:

FIGS. 4A & 4B In partial section, the third embodiment of the invention.

DESCRIPTION OF THE PREFERRED EMBODIMENTS

Figure 1:
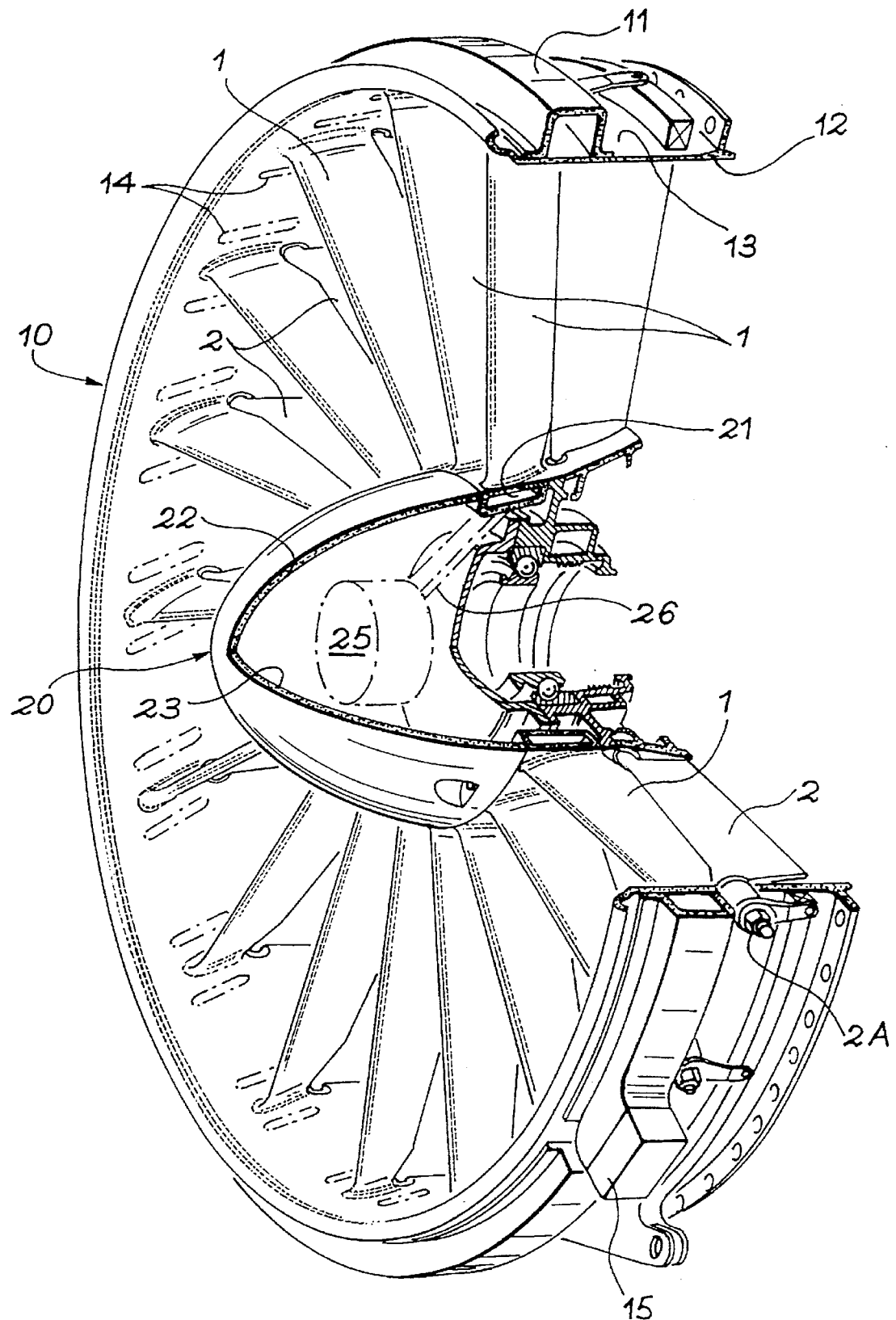
FIG. 1 The front part of a turbojet according to the invention, on which are shown the three embodiments thereof.

With reference to FIG. 1, the intake of a turbojet or turbojet engine inter alia comprises radial arms 1 fixed between an outer, annular structure 10 and a central structure 20. Each of the radial arms is extended by a flap 2 mobile in rotation about a spindle 2a perpendicular to the turbojet axis. The air flow penetrating the turbojet between each radial arm 1 is consequently conditioned for its use downstream in the turbojet.

It is readily apparent that icing phenomena can frequently occur at the components positioned in front of the turbojet, bearing in mind the atmospheric conditions through which aircraft fly. Certain of the elements of the main embodiments of the invention are shown in FIG. 1. Thus, it is possible to see a outside, annular waveguide 11 placed on the outer surface 13 of the outer sleeve 12 constituting the outer structure 10 and the inner surface of the outside, annular waveguide 11. This waveguide 11 has two series of slots, whereof the outer slots 14 issue between the radial arms 1. Thus, the microwaves routed in the waveguide 11 then pass out along the radial arms 1 and act by electromagnetic energy dissipation in the water droplets or ice particles covering the surfaces of the radial arms 1.

Other slots are provided facing the radial arms 1 and issuing into the latter, so as to act on the outer surfaces of the walls of the radial arms 1 by means of said walls.

A first microwave generator 15 is shown at the bottom of FIG. 1 facing the first, annular waveguide 11.

Within the central structure 20 is shown in mixed line form, a second microwave generator 25, as well as a transverse waveguide 26. The latter issues into a inside, annular waveguide 21 placed against the inner surface 23 of the cowl 22 of the central structure 20. This inside, annular waveguide 21 has equivalent slots to the outside, annular waveguide 11 in order to transmit electromagnetic energy to the radial arms 1 in the same way.

FIRST EMBODIMENT

Figure 2B:
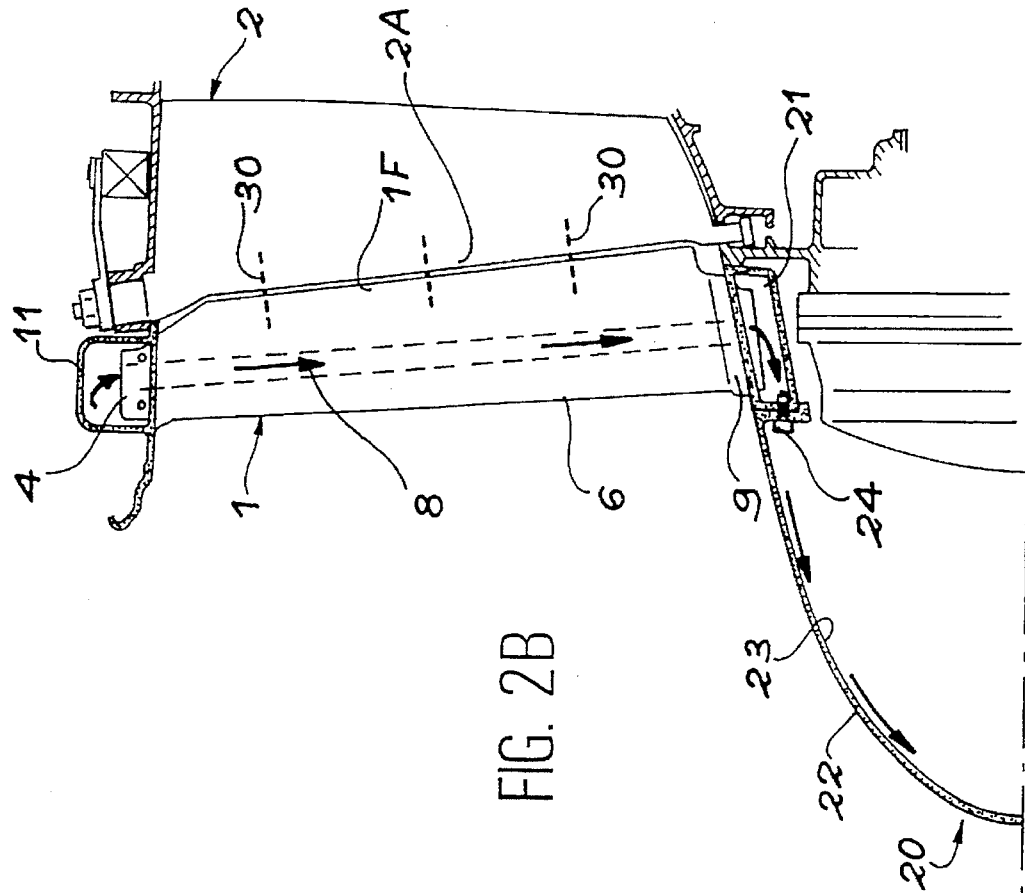
FIGS. 2A & 2B In partial section, the first embodiment of the invention.
Figure 2A:
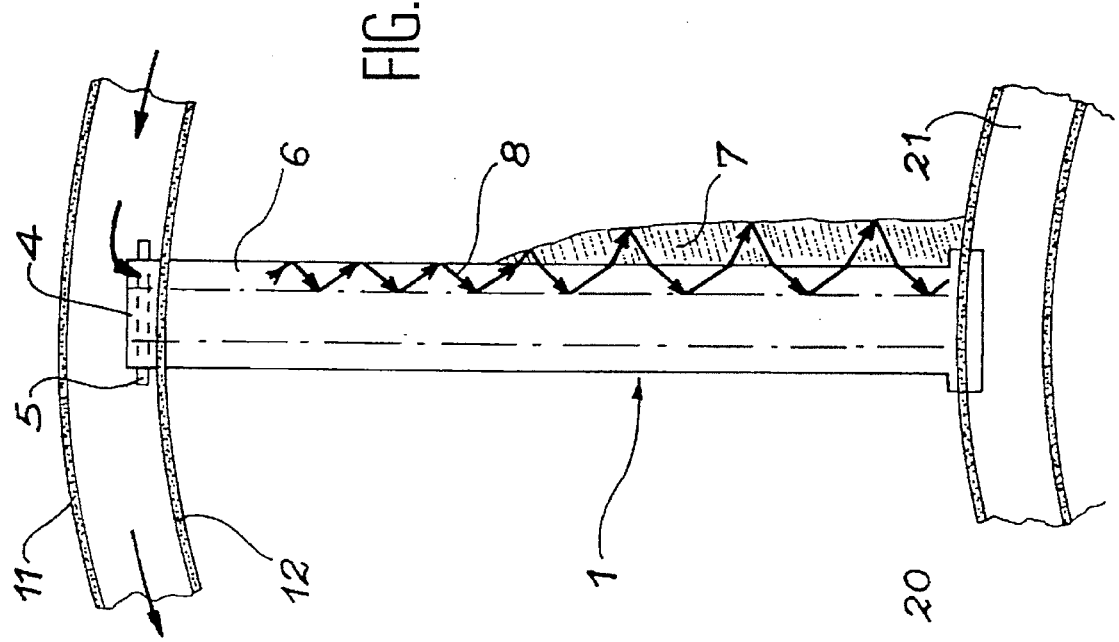

With reference to FIG. 2A, in the first embodiment of the invention each radial arm 1 is fixed in the outside, annular waveguide 11 and on the central structure 20. The outer end 4 of each radial arm 1 is placed within the outside, annular waveguide 11 by means of a first series of slots made in the annular sleeve 12. A pin 5 makes it possible to lock said arrangement by traversing the outer end 4 of the radial arm within the outside, annular waveguide 11. Thus, each pin 5 constitutes a coupling means between a radial arm, which is a means for distributing energy on the elements to be deiced and the outside, annular waveguide 11, which is a transmission means.

In FIG. 2A the radial arm 1 is shown with two mixed lines, symbolizing its walls 6. An ice layer 7 has accumulated against the radial arm 1. An arrow chain 8 symbolizes the routing of the microwaves, which penetrate, by means of the outer end 4 of the radial arm 1, the interior of the outside, annular waveguide 11, so as to then traverse the entire wall 6 of the radial arm 1 and encroach on the ice particles 7.

FIG. 2B shows the same components viewed from the side. It can be seen that once the microwaves have arrived at the inner end 9 of the radial arm 1, they can be discharged by the inside waveguide 21 and transmitted to the cowl 22 by means of bolts 24 serving as electromagnetic energy coupling means. Thus, the entire outer surface 23 of the cowl 22 can be subject to the same electromagnetic energy conditions with the same deicing aim.

FIG. 2B also shows coaxial conductor cables 30 in interrupted line form, which connect the trailing edge 1F of the radial arm 1 to the leading edge 2A of the flap 2. Thus, the microwaves passing through the walls 6 of the radial arm 1, in part pass into the walls of the flap 2, due to the electromagnetic transmission means.

In this embodiment, the walls 6 of the radial arms 1 are made from composite materials with a dielectric coating (e.g. of epoxy glass), so as to serve as surface waveguides and electromagnetic energy distribution means.

SECOND EMBODIMENT

Figure 3B:
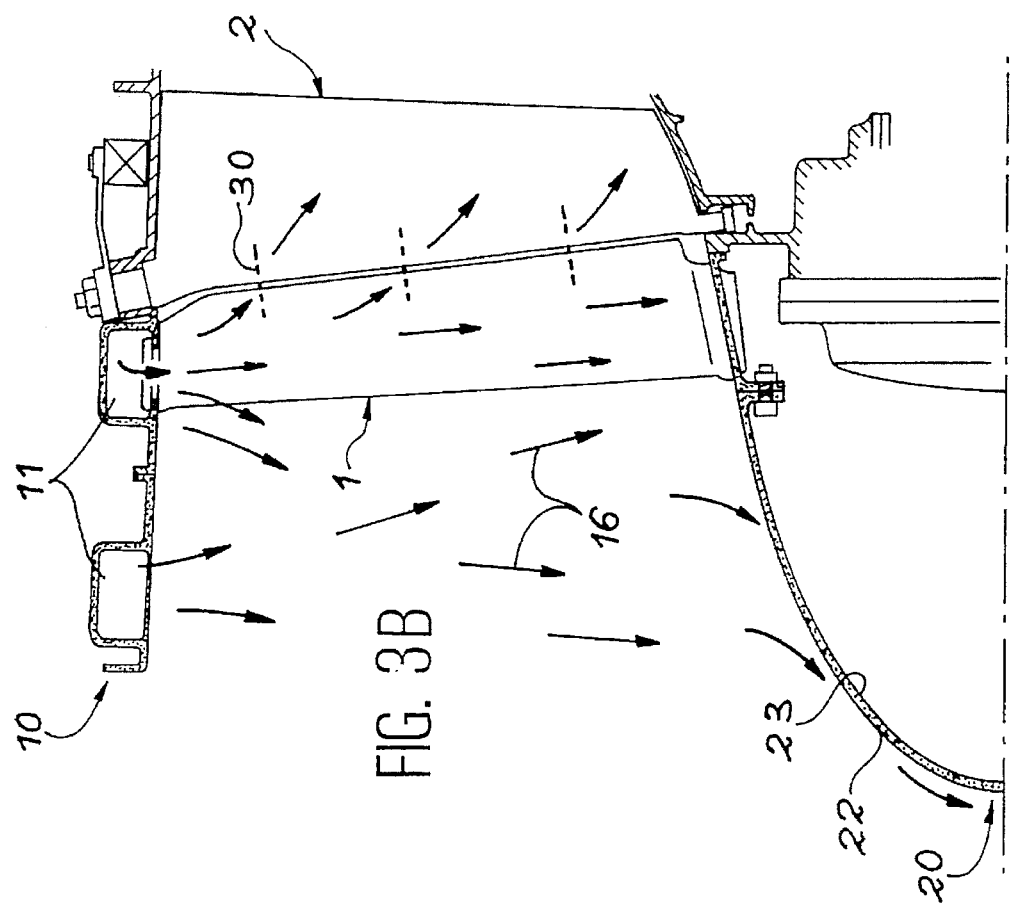
FIGS. 3A & 3B In partial section, the second embodiment of the invention.
Figure 3A:
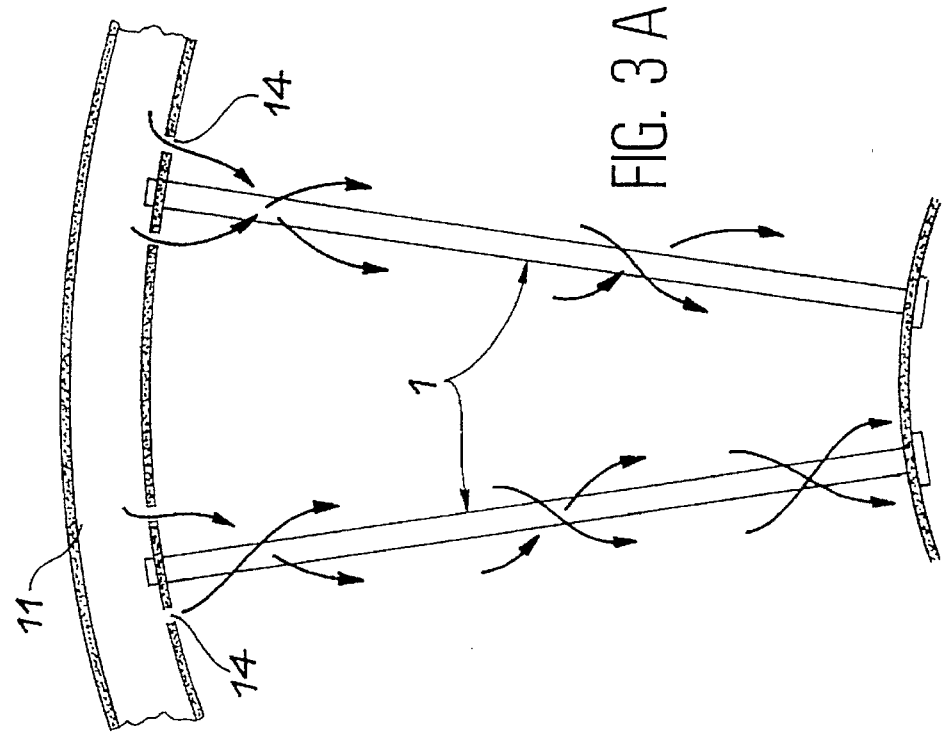

With reference to FIG. 3A, it is possible to see a outside, annular waveguide 11, which is provided with a second series of slots 14 issuing outside the radial arms 1. Thus, part of the microwaves is diffused outside the same and is able to electromagnetically envelop the outer surfaces of the radial arms 1 and thus act on any ice or frost layers.

FIG. 3B shows in section said same second solution. It is completed by a series of arrows 16 symbolizing the path of the microwaves. It should be noted that they could also be oriented along the outer surfaces of the flaps 2.

In order to increase the efficiency of this solution, it would be possible to have several annular waveguides 11 in the outer structure 10. It is therefore possible to supply a large part of the microwaves directly to the outer surface 23 of the cowl 22 of the central structure 20. In other words the slots 14 of said second series act as conductivity holes, as in a slot antenna system, in order to form a wave beam enveloping the components to be deiced. The coaxial conductor cables 30 between the radial arms 1 and the flaps 2 can also be retained.

The slots, lengths and widths of the slots 14 are dimensioned as a function of the emission frequency of the microwaves used. It should be noted that this frequency can be adapted so as to be in a range 2 to 30 GHz, in order to obtain a better heat dissipation efficiency in the ice or in order to reduce the radiation in the engine.

Figure 7:
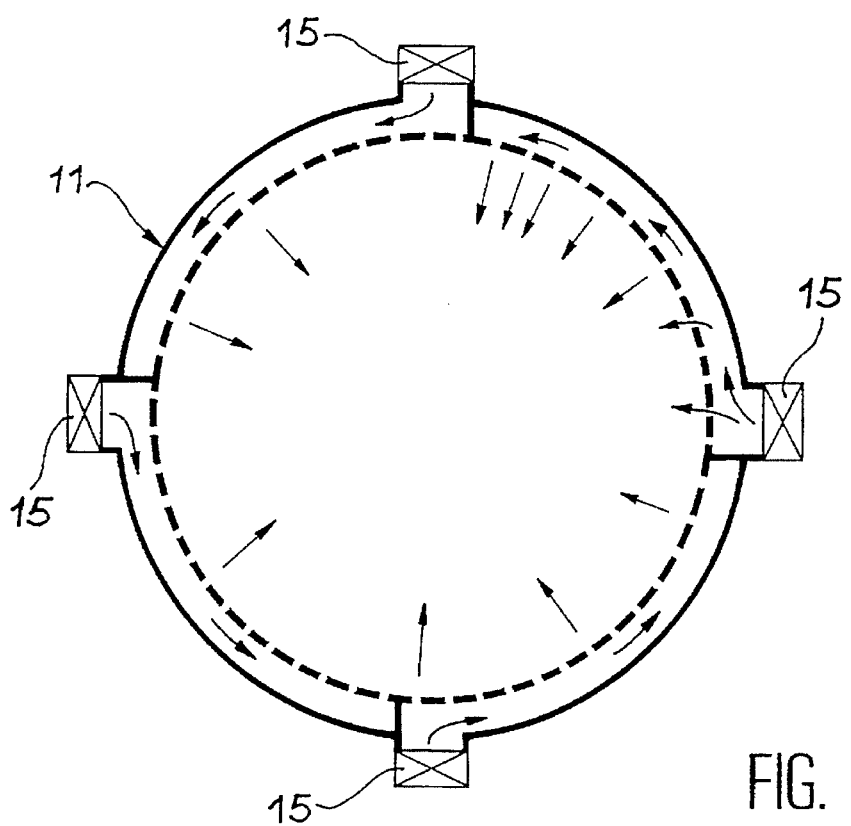
FIG. 7 A diagram of a possible distribution of waves in the first two embodiments of the invention.

In these two first solutions, it is possible to place several microwave generators 15 on the outer structure 10 in order to supply one or more annular waveguides 11. FIG. 7 explains the case where, in the first two solutions, several microwave generators are provided for supplying a single circumference of annular waveguides 11. If four of these are used, they are distributed at 90° intervals about the axis of the turbojet and each ensures the distribution of the microwaves over a quarter of the radial arms.

THIRD EMBODIMENT

FIG. 4A shows an outer sleeve 34 constituting the outer structure 10 and having slots in which are located the outer ends 33 of the radial arms 1. The central structure 20 has an inner, annular waveguide 21. Its outer wall 35 has a series of slots, in each of which is inserted an inner end 32 of a radial arm 1. A fixing pin makes it possible to lock the radial arm 1 in said inner, annular waveguide 21, in a manner identical to the fixing described in FIGS. 2A and 2B, as well as in FIG. 5.

As can be seen in FIG. 4B, a wave generator 25 is provided, as well as a transverse waveguide 26, so as to complete the means for transmitting microwaves to the radial arms 1.

In this embodiment, there are bolts 24 for fixing the inner, annular waveguide 21 to the cowl 22. These bolts 24 also serve as electromagnetic coupling means between the cowl 22 and the inner, annular waveguide 21.

Figure 5:
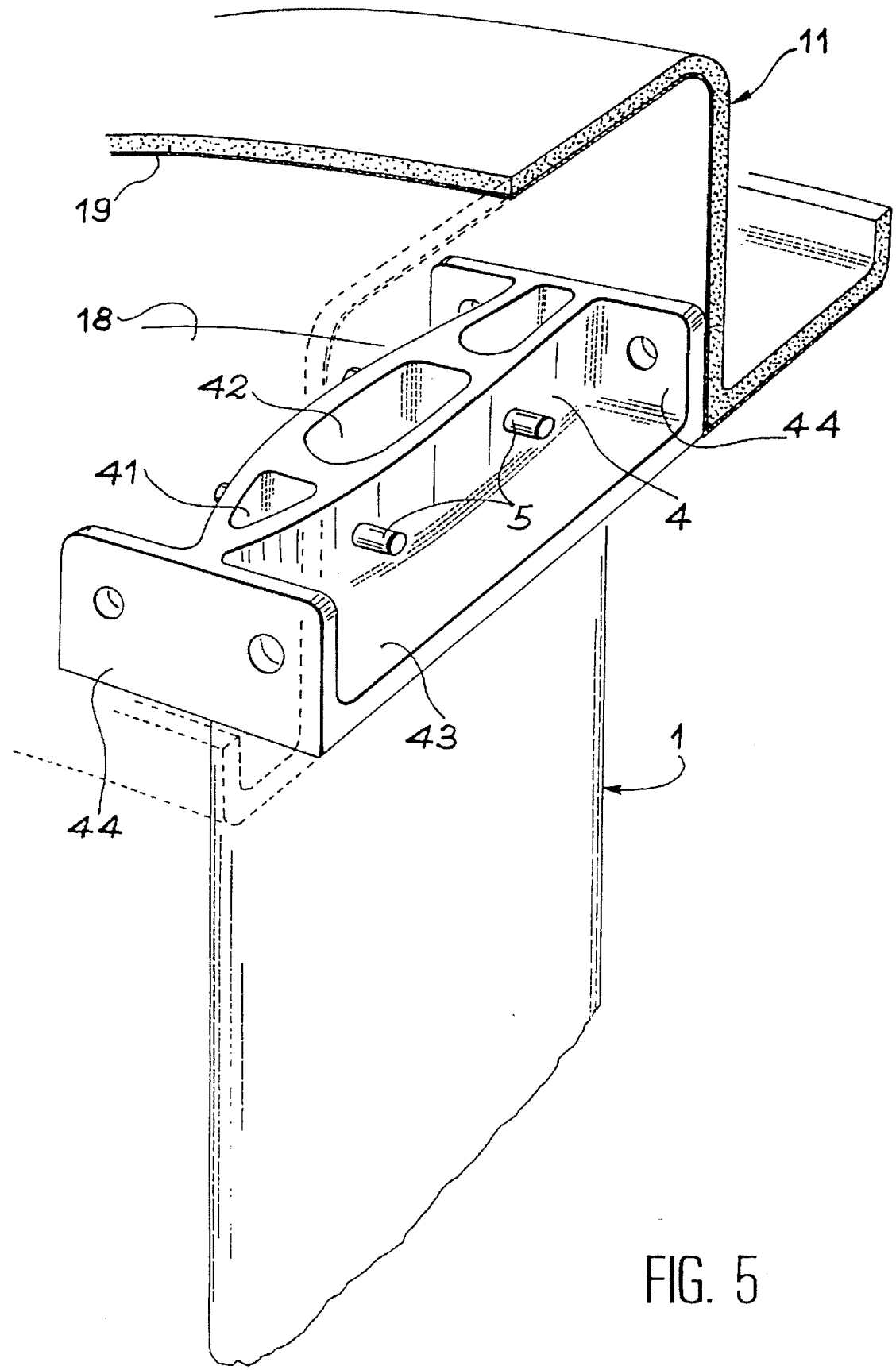
FIG. 5 The fixing of a radial arm according to the first embodiment of the invention.

FIG. 5 explains a fixing example, like that of the first embodiment (cf. FIGS. 2A and 2B). It is possible to see therein the outside, outer, annular waveguide 11, in which is placed the outer end 4 of a radial arm 1. Two fixing pins 5 traverse said outer end 4 in order to ensure the locking of the assembly, but also the electromagnetic coupling. The arm is positioned within said outside, annular waveguide 11 by means of a support 43 resting on the inner surface 18 of the annular waveguide 11 facing the radial arm 1. This support 43 can be supplemented by two positioning sides 44, placed on either side of the outer end 4 of the radial arm 1.

It can be seen that the structure of the radial arm 1 is preferably half hollow. In other words, two or three longitudinal cavities 41, 42 can be provided within the radial arm 1. The latter is preferably made from a dielectric composite material, e.g. epoxy glass. The outside, outer, annular waveguide 11 is also preferably made from a composite material, but its outer surface 19 is metallized in order to aid the guiding of the electromagnetic waves.

Figure 6:
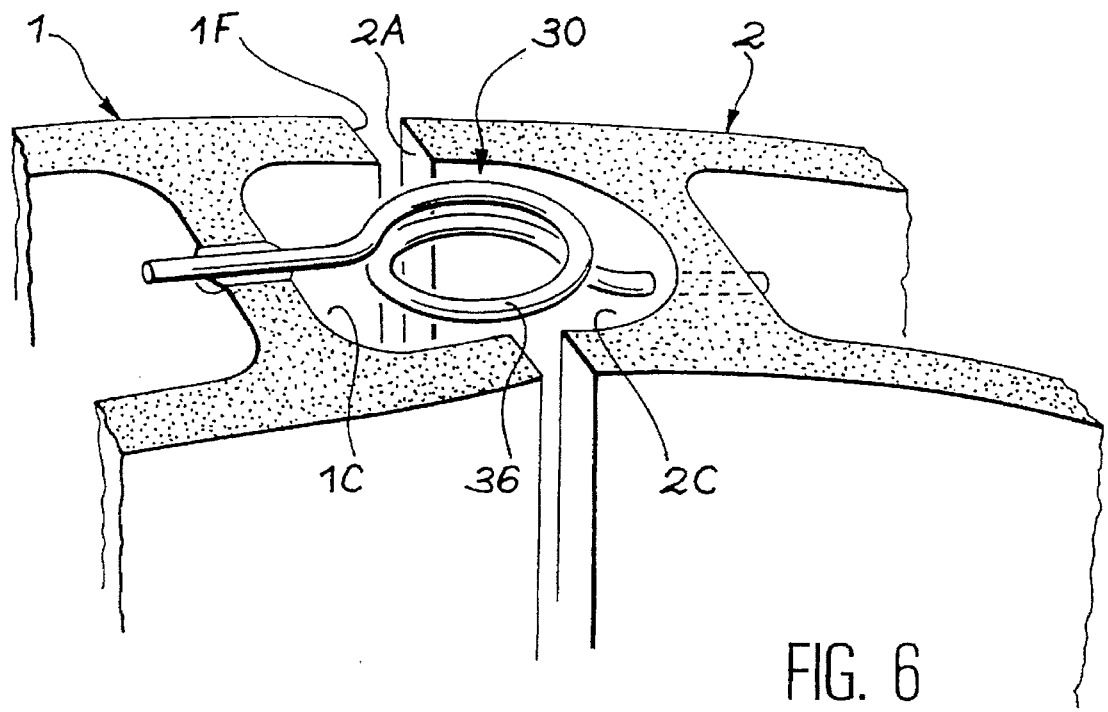
FIG. 6 The coupling between a mobile flap and its corresponding radial arm.

With reference to FIG. 6, the microwave transmission means between the arms 1 and the mobile flaps 2 are preferably constituted by several coaxial, conductor cables 30. If necessary, the latter can be in the form of a loop 36 located in a cavity 1C of the radial arm 1 and a cavity 2c of the mobile flap 2.

The frequency of the microwaves can be in a range 2 to 30 GHz, in order to obtain a better effectiveness of the heat dissipation in the ice, or in order to reduce the parasitic radiation in the engine. If necessary, it is possible to use in the design of the components to be deiced, materials able to absorb microwaves and able to heat the structure to a greater or lesser extent in order to prevent a possible refreezing of the water droplets.

ADVANTAGES OF THE INVENTION

No air sampling is required in order to ensure the heating of the components to be deiced. This leads to an improvement in the turbojet efficiency.

In view of the fact that no piping or valves are required in this heating system, there is a reduction in the overall weight.

The energy consumed is relatively low, because virtually only the ice is heated.

In the absence of a heat source, it is possible to use composites of the "cold" type, which are easier to implement and which are less expensive. This avoids thermal stresses in the turbojet structures. The thus used electromagnetic technology is relatively simple and reliable.

The radial dimensions required for the installation of such a technology are relatively small.

We claim:

1. A turbojet comprising:

an air intake case having radial arms between an outer annular structure and an inner central structure, said radial arms being made from a dielectric composite material;

a deicing unit configured to deice said radial arms by microwaves and located in said central structure, said deicing unit having a microwave generator and a transmitting element configured to transmit energy supplied by said microwave generator, said transmitting element comprising an inside annular waveguide located inside of said central structure;

an energy distributing element configured to eliminate ice; and a coupling element coupling said transmitting element and said energy distributing element.

2. A turbojet according to claim 1, further comprising an additional deicing unit provided at said outer annular structure, said additional deicing unit having at least one outside annular waveguide and a microwave generator.

3. A turbojet according to claim 2, wherein said outside annular waveguide has a series of transverse openings on an inner wall of said outside annular waveguide, outer ends of said radial arms are placed in said openings respectively, and said outer ends are fixed to said outer annular structure.

4. A turbojet according to claim 3, wherein said radial arms are fixed to said outer annular structure by pins traversing said outer ends in said outside annular waveguide.

5. A turbojet according to claim 2, wherein said outside annular waveguide has a series of transverse openings on an inner surface of said outside annular waveguide, said openings being formed between and alongside said radial arms so as to orient the microwaves onto outer surfaces of said radial arms.

6. A turbojet according to claim 1, wherein said inside annular waveguide has a series of transverse openings on an outer surface of said inside annular waveguide, inner ends of said radial arms are placed in said openings respectively, and said inner ends are fixed to said central structure.

7. A turbojet according to claim 6, wherein said coupling element has bolts configured to fix said inside annular waveguide to said central structure.

8. A turbojet according to claim 1, wherein each radial arm has a mobile flap, and said transmitting element has a coaxial conductor cable connecting a trailing edge of each radial arm and a leading edge of each mobile flap.

* * * * *